United States Patent
Futagami et al.

(10) Patent No.: US 6,663,923 B2
(45) Date of Patent: Dec. 16, 2003

(54) GLASS PANEL

(75) Inventors: Toru Futagami, Osaka (JP); Shinjiro Domi, Osaka (JP); Koichi Sakaguchi, Osaka (JP); Shigeki Nakagaki, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/276,790

(22) PCT Filed: Nov. 27, 2001

(86) PCT No.: PCT/JP01/10343

§ 371 (c)(1),
(2), (4) Date: Nov. 20, 2002

(87) PCT Pub. No.: WO02/44098

PCT Pub. Date: Jun. 6, 2002

(65) Prior Publication Data

US 2003/0108693 A1 Jun. 12, 2003

(30) Foreign Application Priority Data

Nov. 30, 2000 (JP) ......................................... 2000-365409

(51) Int. Cl.⁷ .............................. E06B 3/24; E04C 2/54
(52) U.S. Cl. ..................................... 428/34; 52/786.13
(58) Field of Search .......................... 428/34, 192, 409; 52/786.1, 786.13

(56) References Cited

U.S. PATENT DOCUMENTS 6,365,242 B1 * 4/2002 Veerasamy ................... 428/34
6,387,460 B1 * 5/2002 Shukuri et al. ............... 428/34

FOREIGN PATENT DOCUMENTS

| JP | 11-268934 A | 10/1999 |
| JP | 2000-119046 A | 4/2000 |
| JP | 2000-159549 A | 6/2000 |

* cited by examiner

*Primary Examiner*—Donald J. Loney
(74) *Attorney, Agent, or Firm*—Fulbright & Jaworski L.L.P.

(57) ABSTRACT

To maintain high bonding performance between two glass sheets by metal material, thereby to obtain high gas tightness and bonding strength. A glass panel includes a pair of glass sheets (1A, 1B) disposed in opposition to each other with forming a gap (V) therebetween, the peripheral edges of the opposed glass sheets (1A, 1B) being directly bonded to each other by metal material (5); wherein bonding faces (1Aa) in the opposed surfaces of the glass sheets (1A, 1B) to be bonded to the metal material (5) are worked so as to obtain an average surface roughness below 30 nm.

8 Claims, 5 Drawing Sheets

| sample No. | average surface roughness (nm) | judgment |
|---|---|---|
| 1 | 40 | no good |
| 2 | 30 | no good |
| 3 | 25 | good |
| 4 | 20 | good |
| 5 | 15 | good |
| 6 | 10 | good |
| 7 | 9 | good |
| 8 | 8 | good |
| 9 | 7 | good |
| 10 | 5 | good |

GLASS PANEL

TECHNICAL FIELD

The present invention relates to a glass panel including a pair of glass sheets disposed in opposition to each other with forming a gap therebetween, peripheral edges of the glass sheets being directly bonded together by metal material so as to seal the gap gas-tightly.

BACKGROUND ART

Conventionally, a glass panel of the mentioned type, as shown in FIG. 7, includes a pair of glass sheets 1A, 1B disposed in opposition to each other with forming a gap V therebetween and metal solder 20 is charged in a molten state between the peripheral edges of the opposed glass sheets 1A, 1B, so that the glass sheets 1 are directly bonded together with subsequent solidification of the metal solder (see the international publication WO 00/58234 for example). And, no special attention has been paid to the condition on the surfaces of the glass sheets at the bonding faces of the glass sheets to be bonded to the metal material.

Incidentally, in general, the glass and molten glass have a large contact angle, i.e. poor wettability, relative to each other. Then, it may be said that these are materials difficult to be bonded to each other. Further, it is known that the greater the degree of unevenness in the glass surface, the more conspicuously this tendency shows.

Therefore, in the case of such conventional glass panel above, if the glass sheet is provided, at its bonding face, with a function additive film such as a low-radiation film made of e.g. stannic oxide, or if the glass sheet is a frosted glass sheet having frosting treatment in its bonding face, there exists a large degree of surface unevenness in its bonding face. So that, poor wettability appears conspicuously at the boding faces between the glass sheets and the molten metal, whereby sufficient bonding condition therebetween cannot be obtained. That is, it becomes impossible to maintain the gas tightness in the gap between the glass sheets or the glass sheets can even be separated from each other.

Accordingly, an object of the present invention is to provide a glass panel which overcomes the above-described problem and with which the bonding performance provided by the metal material between the glass sheets can be secured easily, thus achieving sufficient bonding strength at the bonding portions and high gas tightness.

DISCLOSURE OF THE INVENTION

According to the characterizing feature of the present invention relating to claim 1, a glass panel includes a pair of glass sheets 1A, 1B disposed in opposition to each other with forming a gap V therebetween, the peripheral edges of the opposed glass sheets 1A, 1B being directly bonded to each other by metal material 5, wherein bonding faces 1Aa in the opposed surfaces of the glass sheets 1A, 1B to be bonded to the metal material 5 are worked so as to obtain an average surface roughness below 30 nm.

With the characterizing feature of the invention relating to claim 1, it becomes possible to maintain high wettability between the glass sheets and the metal material at the bonding faces 1Aa, thereby to ensure bonding performance therebetween required for the glass panel.

This effect has been confirmed based on the finding obtained from an experiment conducted by the inventor (see the experiment results described in the embodiment).

That is, as described hereinbefore, the glass sheet and the metal material have a large contact angle, hence, poor wettability relative to each other. In addition, if the bonding face of the glass sheet relative to the metal material has significant surface unevenness, the bonding difficulty will further increase. Then, by setting the average surface roughness of the bonding face of the glass sheet below 30 nm, appropriate bonding strength for the glass sheets may be maintained and the gas tightness in the gap between the glass sheets may be maintained also.

According to the characterizing feature of the present invention relating to claim 2, the bonding faces 1Aa in the opposed surfaces of the glass sheets 1A, 1B to be bonded to the metal material 5 have an average surface roughness equal to or less than 15 nm.

With the characterizing feature of the invention relating to claim 2, it becomes possible to maintain even higher wettability between the glass sheets and the metal material at the bonding faces a, thereby to ensure even better bonding performance therebetween required for the glass panel.

This effect has been confirmed based on the finding from the experiment conducted by the inventor (see the experiment results described in the embodiment).

According to the characterizing feature of the present invention relating to claim 3, as shown in FIG. 2 for example, at least one glass sheet 1A of the two glass sheets 1 is a function-added glass sheet including a function additive film F on the side thereof facing the other glass sheet 1B.

With the characterizing feature of the invention relating to claim 3, in addition to the function/effect achieved by the invention relating to claim 1 or 2, it is possible to provide the glass panel with the function obtained by the function additive film.

For instance, if the function additive film is a function additive film having low-radiation function having a low radiation, it is possible to reduce the heat loss through the glass panel, whereby the heat insulating effect of the glass panel may be enhanced.

Further, the function additive film is not limited to the low-radiation film described above. This function additive film may be freely selected as such function additive film having a variety of functions of heat absorption, heat reflection, UV absorption, etc.

When such function additive film has a significant unevenness, it used to be difficult to bond this with metal material. With the present invention, however, by finishing the bonding faces with the predetermined average surface roughness specified above, it is possible to ensure sufficient bonding condition, hence obtaining a glass panel having the required gas tightness in its gap.

According to the characterizing feature of the present invention relating to claim 4, at least one glass sheet 1A of the two glass sheets 1 is a frosted glass sheet having frost working on the side thereof facing the other glass sheet 1B.

With the characterizing feature of the invention relating to claim 4, in addition to the function/effect achieved by the invention relating to claim 1 or 2, it is possible to provide the glass panel with the function of frosted glass.

For instance, it becomes possible to form a good-looking glass panel added with the blind function while allowing transmission of soft diffused light.

The surface with such frost working has a relatively large unevenness. Hence, it was substantially difficult for the prior art to bond it with metal material. However, by finishing the bonding faces with the predetermined average surface roughness specified above, it is possible to ensure sufficient bonding condition, hence obtaining a glass panel having the required gas tightness in its gap. Here, as means for adapting the bonding faces to the predetermined average surface roughness specified above, this may be done by effecting an operation for reducing the average surface roughness of the bonding face after its frost working. Alternatively, this is also possible by effecting the frost working on the portions thereof excluding the bonded faces or not effecting the frost working on the bonding faces at all or limiting the degree of frost working to be provided on the bonding faces so that the bonding faces may maintain the above-specified average surface roughness.

According to the characterizing feature of the present invention relating to claim 5, the bonding faces 1Aa of the glass sheets 1 relative to the metal material 5 has its average surface roughness adjusted by a surface working comprising a mechanical polishing, a chemical polishing or combination thereof With the characterizing feature of the invention relating to claim 5, in addition to the function/effect achieved by the invention relating to any one of claims 1–4, it is possible to obtain substantially desired average surface roughness by appropriately selecting the polishing method or appropriately setting the polishing condition. Consequently, with a simple process, the machining accuracy may be improved.

BEST MODE OF EMBODYING THE INVENTION

The present invention will be described in greater details by way of an mode of its embodiment with reference to the drawings. Incidentally, in these drawings, those portions same as the conventional construction are denoted with same or like reference marks.

Figure 1:
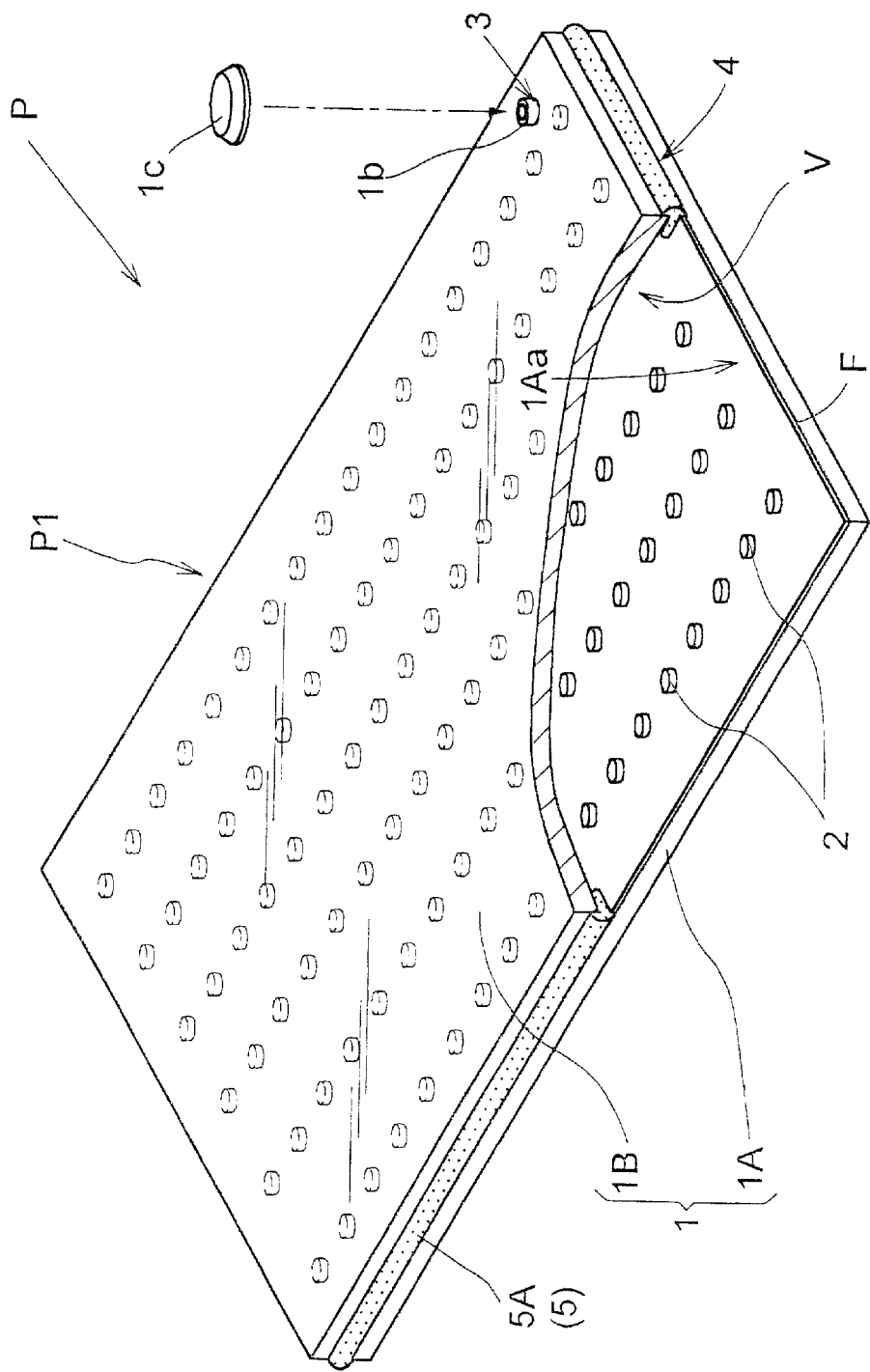
FIG. 1 is a partially cutaway perspective view showing a glass panel.
Figure 2:
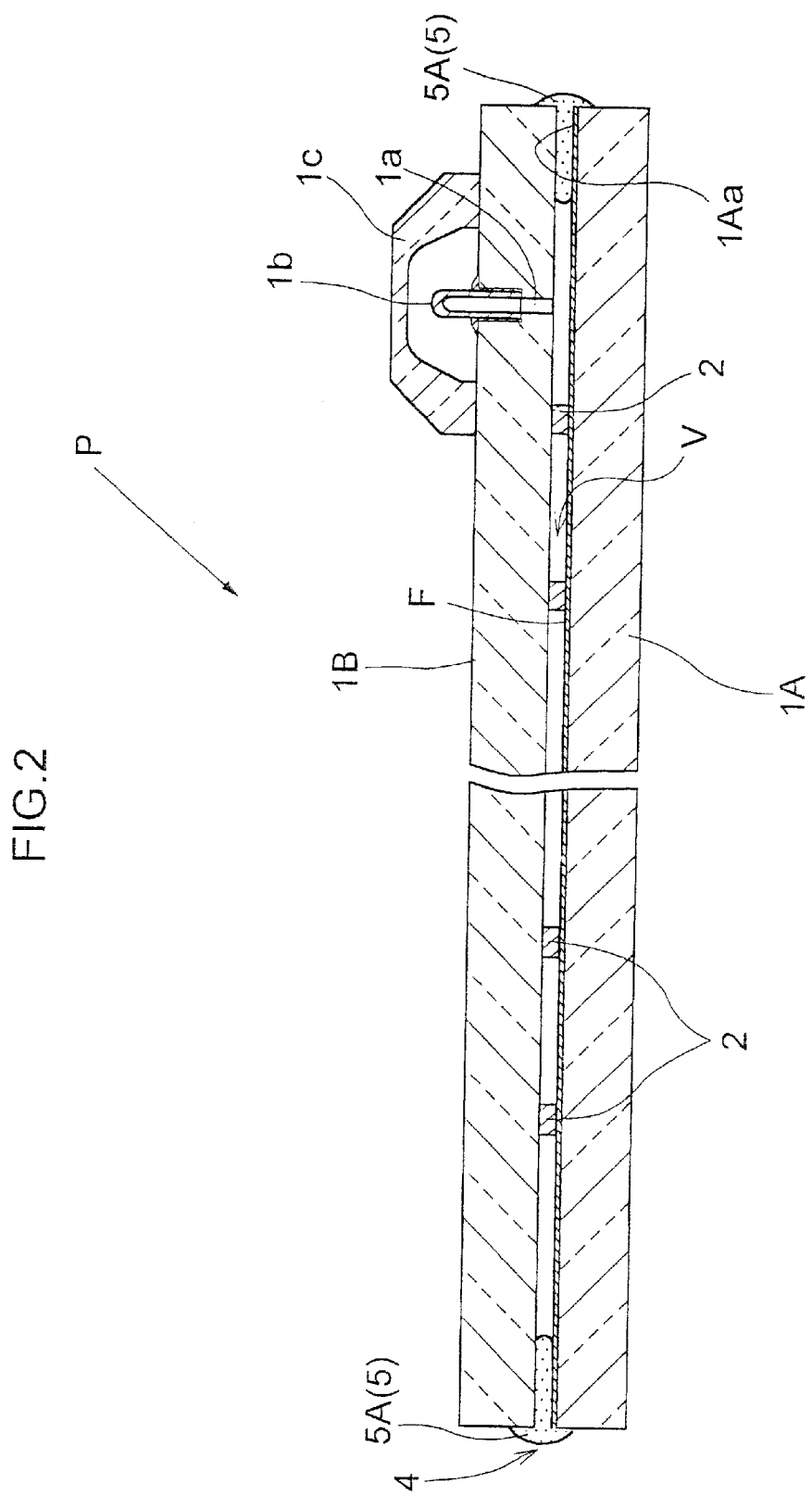
FIG. 2 is a section view showing the glass panel.

FIG. 1 and FIG. 2 show an example of a glass panel relating to the present invention. The glass panel P comprises a glass panel body P1 including a pair of glass sheets 1A, 1B, a number of spacers 2 spaced apart from each other and disposed between the glass sheets 1A, 1B along the sheet faces thereof, an outer periphery seal portion 4 formed of metal and disposed along and between the outer peripheries of the two glass sheets 1A, 1B and a suction portion 3 formed in either glass sheet 1B of the pair of glass sheets 1 for evacuating and sealing a gap V formed between the two glass sheets 1, so that the glass panel body P1 is sealed after evacuation of air from inside the gap V through the suction portion 3.

One glass sheet 1A and the other glass sheet 1B of the pair of glass sheets 1 are both float glass sheets (having a thickness from 2.65 mm to 3.2 mm for example). Also, on the side of the one glass sheet 1A facing the gap V, there is formed a function (low-radiation) additive film F formed of stannic oxide by the CVD method. With this function additive film F, it becomes possible to achieve heat-insulating effect while retaining the light-admitting property, the transparency and the viewing property of the glass panel P.

Further, in the surface of the one glass sheet 1A, its face portion (corresponding to "bonding face") to be bonded with the outer periphery seal portion 4 is subjected to a polishing finish to obtain an average surface roughness below 30 nm (preferably, equal to or less than 15 nm). As the polishing method to be employed here, any conventional methods using a polishing wheel, a polishing belt or the like may be employed.

For instance, in case the function additive film has, on its surface, some unevenness which should be eliminated, it is possible to carry out a smoothing operation using the polishing wheel or the like on the function additive film. Further, in the case of the known etching treatment, by exposing the glass surface, this surface may be smoothed out. Alternatively, in the case of the chemical polishing method using an oxidation-reduction reaction, if the function additive film is formed of an oxide for example, it is possible to set the average surface roughness of this oxide film at any desired value. In these ways, a variety of polishing methods can be employed.

Incidentally, the "average surface roughness" represents an average value of surface unevenness measured within a measurement area in order to represent quantitatively the surface unevenness. For instance, this may be easily measured by using a scanning type probe microscope (e.g. the one manufactured and sold by SII under the trade name of SPI3700/SPA300).

The spacer 2 is formed preferably of a material having a compression strength equal to or greater than 490 MPa ($5000/cm^2$). In the instant embodiment, each spacer is formed of Inconel 718. If the strength is lower, the spacer 2 can be destroyed by the atmospheric pressure applied to the glass sheets 1, thus failing to form the gap V. So that, the two glass sheets will come into direct contact with each other, as a result of which the deterioration of the heat-insulating performance of the glass panel per se or even destruction of the glass sheets forming the glass panel may occur.

Further, referring to the shape of the spacer 2, it is formed as a cylindrical shape, with dimensions of a diameter of 0.3 mm to 1.0 mm, a height of 0.2 mm. And, as it is formed as a cylindrical shape, the spacer hardly forms angular corners at its portions contacting the glass sheets 1. So that, stress, if any, applied from the spacer 1 to the glass sheets 1 may be effectively diffused so as not to destroy the glass sheets 1. The spacers 2 are arranged with vertical and lateral spacing of 20 mm in the direction along the sheet surfaces.

In the outer periphery seal portion 4, molten solder (corresponding to "metal material 5") is disposed integrally along and between the peripheral edges of the two glass sheets 1A, 1B so as to seal the gap V in a gas tight manner.

And, the gap V is placed under a depressurized condition (e.g. 0.13 Pa ($1.0 \times 10^{-3}$ Torr) or lower) by an evacuating/depressurizing operation through the suction portion 3.

The solder 5A comprises a composition containing Sn, Zn, Ti, O, etc. In the instant embodiment, this composition can contain, for example, 0.001 to 3.0% of Ti, 72 to 99.9% of Sn, 0.1 to 10.0% of Zn, and substantially no Pb or Pb below 1%.

In addition to the above components, In, Ag, Bi and Sb may be added if appropriate.

'In' provides not only the function of reducing the melting point of the solder, but also the functions of improving the wettability and softening the solder per se. If the addition amount of In is below 0.1%, its effect will be low. Conversely, if the amount exceeds 50%, this will make it difficult to secure sufficient strength for the solder per se, and also increase the cost considerably.

'Ag', if added, achieves distinguished effect for improvement of the mechanical strength of the solder. If the addition amount of Ag is below 0.1%, its effect will be low and improved mechanical strength will not be achieved. If the amount exceeds 6%, the melting point will be higher and also there will be formed a large amount of intermetallic compound with Sn, thus leading to deterioration in the mechanical strength to the contrary. The preferred addition amount is from 0.1 to 3.5%.

Further, more than one kind of element of Bi and Sb may be added appropriately within the range of 10% or lower. 'Bi' can improve the wettability of the solder. 'Sb' can improve the appearance of the soldering and can improve the creep resistance as well. Moreover, additionally, such elements as Fe, Ni, Co, Ga, P, etc. may be added by a trace amount for improved properties of the solder, such as realization of lead-free composition, enhancement of soldering property and mechanical strength thereof.

Figure 4:
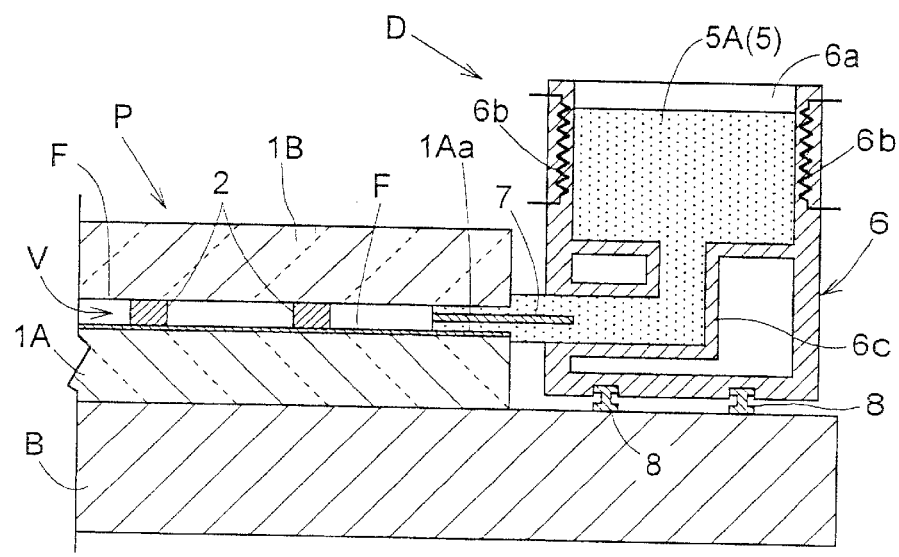
FIG. 4 is an explanatory section view illustrating the method of forming the glass panel.
Figure 5:
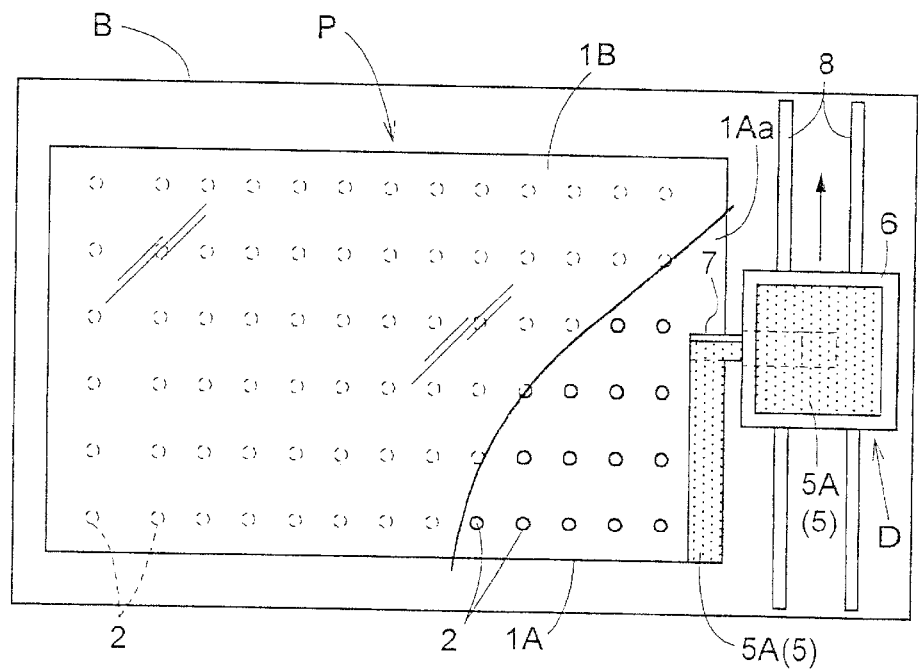
FIG. 5 is an explanatory plan view illustrating the method of forming the glass panel.

Also, the solder 5A is to be charged into the gap between the opposed glass sheets by using a charging device D shown in FIGS. 4 and 5.

The charging device D includes a supply tower 6 for supplying the molten solder 5A to the peripheral edge of the glass panel body P1. The supply tower 6 includes a melting pot portion 6a for storing therein molten or non-molten solder 5A, an electric heater 6b capable of maintaining the solder 5A under the molten state by heating the melting pot portion 6a, an inlet passage 6c extending first downwardly from the bottom of the melting pot portion 6a and further extending horizontally therefrom, and so on. From the vicinity of an opening contacting the outside of the inlet passage 6c, there is laterally projected a flat and thin introducing plate 7 which is very thin vertically (0.1 mm) and extends laterally for a great distance. The supply tower 6 is adapted to be movable on rails 8 mounted on a glass panel forming mount B along the side of the glass panel body P1 which also is mounted on the glass panel forming mount B.

The introducing plate 7 is attached to be located centrally of the opening of the inlet passage 6c. In operation, the molten solder 5A present within the melting pot portion 6a and within the inlet passage 6c will be drawn through the opening along the upper and lower faces of the introducing plate 7 into the gap between the two glass sheets.

Specifically, after the introducing plate 7 is inserted into the gap V between the two glass sheets 1A, 1B, the supply tower 6 will be moved on the rails 8 along the peripheral edge of the glass panel body P1 while supplying the molten solder 5A thereto. With this, the solder 5A may be charged along the entire sides of the two glass sheets 1 so as to directly bond these glass sheets together.

Next, the suction portion 3, as shown in FIGS. 1 and 2, includes a suction opening 1a formed in the one glass sheet 1A, a suction thin glass tube 1b fixed to this suction opening 1a, and a cap 1c for covering the suction opening 1a and the thin glass tube 1b from the above. In operation, after gas present inside the gap V is evacuated through the thin glass tube 1b, the leading end of this thin glass tube 1b is heated to be sealed completely. Then, the cap 1c is attached thereon from the above, whereby the suction portion is completed.

Next, a method of forming the glass panel P will be described.

[1] The pair of glass sheets 1 are cut into predetermined dimensions in advance. In this, as for the one glass sheet 1A having the function additive film F thereon, a polishing operation is effected in advance on its portions corresponding to the outer periphery seal portion 4 so as to obtain an average surface roughness below 30 nm (preferably, equal to or less than 15 nm) there. The measurement of the average surface roughness was conducted under the following conditions by using a scanning probe microscope manufactured by SII.

pretreatment method of substrate: air blow after ultrasonic cleaning;

cantilever: SI-DF20 measurement range: 3 $\mu$m□ measurement mode: DFM (cyclic contact mode)

measurement position: a portion where no attached substance was observed by an optical microscope (low magnification) was measured.

Figure 3:
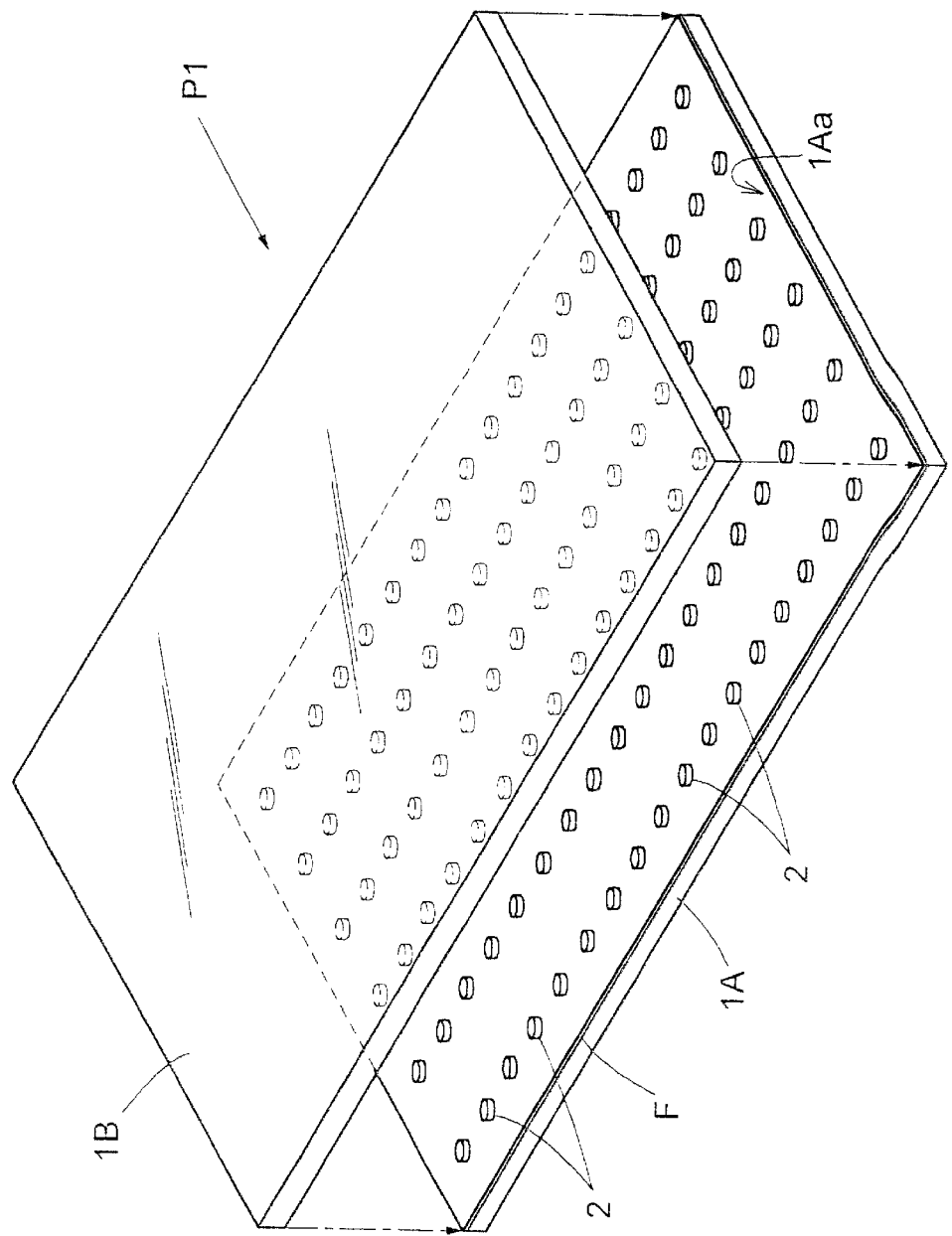
FIG. 3 is an exploded perspective view illustrating a method of forming the glass panel.

[2] After the one glass sheet 1A is placed on the glass panel forming mount B, the spacers 2 are disposed at respective predetermined positions and then the other plate glass 1B is superposed thereon (see FIG. 3).

[3] The introducing plate 7 of the charging device D is inserted into the gap V between the two glass sheets 1 and at the same time the charging device D per se is disposed as close as possible to the two glass sheets 1. Under this condition, the solder 5A present under the molten state within the melting pot portion 6a and the inlet passage 6c is supplied to the gap V.

Then, by moving the entire charging device D at a fixed speed along a side of the glass panel body P1 the solder 5A is charged along the entire side, thereby to bond the two glass sheets 1 together.

[4] Subsequently, by repeating the above operation [3] for each side of the glass panel body P1, there is formed the outer periphery seal portion 4 extending along the entire periphery of the panel body P1.

[5] Then, by rendering the gap V between the glass sheets 1 into the evacuated depressurized condition by using the suction portion 3, there is formed a glass panel P providing a high heat insulating performance.

In this glass panel P formed in the above-described manner, the solder 5A is charged reliably along the outer peripheries of the two glass sheets 1 and these two glasses are integrally and firmly bonded together.

Incidentally, regarding the setting of the average surface roughness of the face portion 1Aa of the one glass sheet 1 corresponding to the outer periphery seal portion 4, this setting was determined by an experiment described below and based on the resultant performance of the outer periphery seal portion 4 formed.

[Experiment]

In this experiment, change in the depressurization degree in the gap V was measured over time for each of several sample glass panels P which were formed with varying the average surface roughness of the face portion 1Aa of the one glass sheet 1A.

The samples were judged as good if no change was observed after lapse of 28 days and were judged as no good if the depressurization degree had changed.

Figures 6, 7:
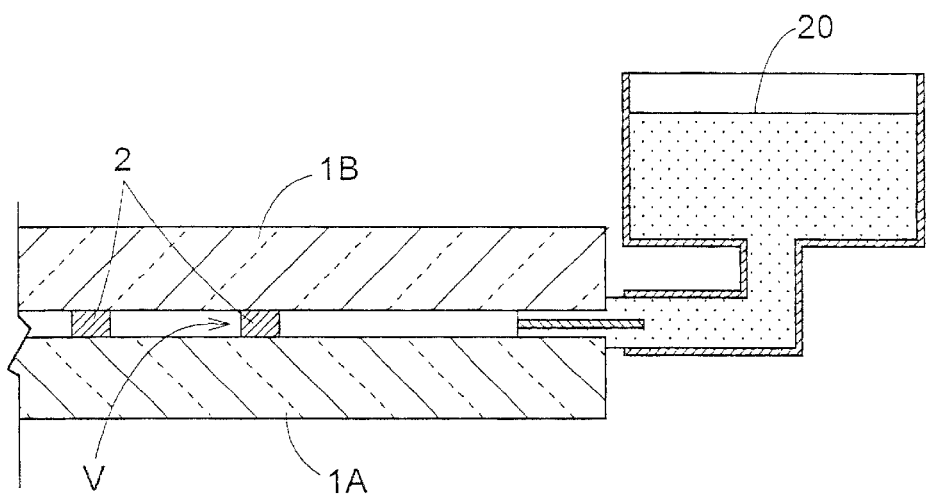
FIG. 6 is a table showing experiment results.
FIG. 7 is a section view of principal portions showing a condition of forming a conventional glass panel.

In this experiment, the average surface roughness of the face portion 1Aa of one glass sheet 1A was varied as the respective values shown in FIG. 6.

The results of this experiment, as shown in FIG. 6, indicate that the sealing effect of the outer peripheral seal portion 4 is problematic if the average surface roughness of the face portion 1Aa of the one glass sheet 1A is 30 nm whereas the sealing effect is good if it is 15 nm.

[Other Embodiments]

Next, other embodiments will be described.

<1> The glass panel relating to the present invention may be used for various applications, such as for a building, vehicle (windowpane of an automobile, a windowpane of a railway car, a windowpane of a ship), for various instruments (surface glass of a plasma display apparatus, a opening/closing door or a wall of a refrigerator, an opening/closing door or wall of a heat reserving device).

Further, the evacuated depressurized condition in the gap between the two glass sheets of the glass panel is not limited to the condition described in the foregoing embodiment, i.e. 0.13 Pa ($1.0 \times 10^{-3}$ Torr) or lower. The evacuation/depressurization degree per se may be freely set. Or, it may even be a pressure condition equal to the atmospheric pressure.

<2> The glass sheet is not limited to the sheet glass described in the foregoing embodiment which has the thickness from 2.65 mm to 3.2 mm. The glass sheet may have other values of thickness. Further, the glass panel may be formed by using in combination one glass sheet and the other glass sheet which sheets are different in thickness from each other.

Also, the type of glass sheet may be freely selected. For instance, it may be a figured glass, frosted glass (glass provided with the function of diffusing light through a surface treatment), mesh glass, or a reinforced glass or other glass sheets provided with a function of heat absorption, heat reflection, UV absorption, etc. or these kinds of glass may be used in combination.

Accordingly, the "function additive film" herein is not limited to the low-radiation film. And, it may be freely decided also to which glass sheet the function additive film is to be provided.

Further, the composition of the glass may be soda silica glass (soda lime silica glass), borosilicate glass, aluminosilicate glass, various kinds of crystallized glass.

That is, what is essential here is that the average surface roughness at the bonding faces of the opposing sides relative to the metal material 5 not exceed 30 nm.

<3> The spacer is not limited to the spacer described in the forgoing embodiment made of the Inconel 718. Instead, it may be formed of e.g. stainless steel, other kind of metal, quartz glass, ceramic glass, glass, low-melting glass, etc. In short, the spacer may be formed of any material as long as it can effectively resist deformation so as to prevent the two glass sheets from coming into contact with each other when exposed to an external force.

<4> The outer periphery seal portion 4 is not limited to that described in the foregoing embodiment which is formed by using the solder 5A. Instead, it may contain, as a main component(s) thereof, one or more than two kinds of components selected from e.g. tin, bismuth, lead, zinc, indium, antimony, etc. Further, it may additionally contain one or more than two kinds selected from silver, aluminum, copper, etc.

INDUSTRIAL APPLICABILITY

The glass panel of the present invention may find its applications in various fields such as the field of building construction, vehicles (window shield of automobile, railway car or of a boat), various instruments (display panel of a plasma display device, a door or wall of a refrigerator or heat-insulating device), etc.

What is claimed is:

1. A glass panel including a pair of glass sheets disposed in opposition to each other with forming a gap therebetween, the peripheral edges of the opposed glass sheets being directly bonded to each other by metal material;

wherein bonding faces in the opposed surfaces of the glass sheets to be bonded to the metal material are worked so as to obtain an average surface roughness below 30 nm.

2. The glass panel according to claim 1, wherein the bonding faces in the opposed surfaces of the glass sheets to be bonded to the metal material have an average surface roughness equal to or less than 15 nm.

3. The glass panel according to claim 1, wherein one glass sheet of the two glass sheets is a function-added glass sheet including a function additive film on the side thereof facing the other glass sheet.

4. The glass panel according to claim 1, wherein at least one glass sheet of the two glass sheets is a frosted glass sheet having frost working on the side thereof facing the other glass sheet.

5. The glass panel according to claim 1, wherein the bonding faces of the glass sheets relative to the metal material has its average surface roughness adjusted by a surface working comprising a mechanical polishing, a chemical polishing or combination thereof.

6. The glass panel according to claim 2, wherein one glass sheet of the two glass sheets is a function-added glass sheet including a function additive film on the side thereof facing the other glass sheet.

7. The glass panel according to claim 2, wherein at least one glass sheet of the two glass sheets is a frosted glass sheet having frost working on the side thereof facing the other glass sheet.

8. The glass panel according to claim 2, wherein the bonding faces of the glass sheets relative to the metal material has its average surface roughness adjusted by a surface working comprising a mechanical polishing, a chemical polishing or combination thereof.

* * * * *